(12) United States Patent
Fujiki (10) Patent No.: US 8,937,679 B2
(45) Date of Patent: Jan. 20, 2015

(54) IMAGING DEVICE INCLUDING AN OPTICAL VIEW FINDER AND A DISPLAY UNIT THAT DISPLAYS A LIVE VIEW IMAGE

(71) Applicant: FUJIFILM Corporation, Tokyo (JP)

(72) Inventor: Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/796,181

(22) Filed: Mar. 12, 2013

(65) Prior Publication Data

US 2013/0188086 A1    Jul. 25, 2013

Related U.S. Application Data

(63) Continuation of application No. PCT/JP2011/066401, filed on Jul. 20, 2011.

(30) Foreign Application Priority Data

Sep. 17, 2010  (JP) .................................. 2010-209901

(51) Int. Cl.
| | |
|---|---|
| H04N 5/232 | (2006.01) |
| G03B 13/00 | (2006.01) |
| G03B 3/10 | (2006.01) |

(Continued)

(52) U.S. Cl.
CPC .............. *H04N 5/23293* (2013.01); *G03B 3/10* (2013.01); *G03B 13/02* (2013.01); *G03B 13/36* (2013.01); *H04N 5/23212* (2013.01); *G02B 7/365* (2013.01)
USPC ..................... 348/345; 348/333.09

(58) Field of Classification Search
USPC .............................................. 348/222.1, 345
See application file for complete search history.

(56) References Cited

U.S. PATENT DOCUMENTS

| | | |
|---|---|---|
| 2004/0179128 A1 | 9/2004 | Oikawa |
| 2009/0109321 A1* | 4/2009 | Takeuchi et al. .............. 348/345 |

(Continued)

FOREIGN PATENT DOCUMENTS

| | | |
|---|---|---|
| CN | 101326815 A | 12/2008 |
| JP | 04-030677 A | 2/1992 |

(Continued)

OTHER PUBLICATIONS

International Search Report in PCT/JP2011/066401 filed Jul. 20, 2011.

(Continued)

*Primary Examiner* — Gevell Selby
(74) *Attorney, Agent, or Firm* — McGinn IP Law Group, PLLC (57) ABSTRACT

An imaging device of the present invention includes: an imaging optical system; an imaging element that forms a subject image through the imaging optical system; a display unit that displays the subject image imaged by the imaging element, as a live view image; an optical viewfinder; a synthesis unit that synthesizes an optical image visually checked by the optical viewfinder and the live view image displayed by the display unit; a defocus amount calculation unit that calculates a defocus amount from a focusing state of the subject image; and a display control unit that displaces the live view image displayed on the display unit, with respect to the optical image, according to the defocus amount calculated by the defocus amount calculation unit, and that displays the subject image on the display unit so that the optical image fits the live view image when the defocus amount becomes zero.

20 Claims, 7 Drawing Sheets

(51) Int. Cl.
*G03B 13/02* (2006.01)
*G03B 13/36* (2006.01)
*G02B 7/36* (2006.01)

(56) References Cited

U.S. PATENT DOCUMENTS

| | | | |
|---|---|---|---|
| 2010/0066895 A1* | 3/2010 | Ueda et al. | 348/345 |
| 2010/0073549 A1* | 3/2010 | Sekine | 348/345 |
| 2010/0110272 A1* | 5/2010 | Sugawara | 348/345 |
| 2010/0188522 A1* | 7/2010 | Ohnishi et al. | 348/222.1 |
| 2011/0228140 A1* | 9/2011 | Kazami | 348/240.1 |

FOREIGN PATENT DOCUMENTS

| | | |
|---|---|---|
| JP | 06-113184 A | 4/1994 |
| JP | 2001-309210 A | 11/2001 |
| JP | 2002-116479 A | 4/2002 |
| JP | 2002-314868 A | 10/2002 |
| JP | 2004-191629 A | 7/2004 |

OTHER PUBLICATIONS

Chinese Office Action dated Jul. 31, 2014 with English Translation thereof.

* cited by examiner

Y DIRECTION

IMAGING DEVICE INCLUDING AN OPTICAL VIEW FINDER AND A DISPLAY UNIT THAT DISPLAYS A LIVE VIEW IMAGE

CROSS-REFERENCE TO RELATED APPLICATIONS

This application is a continuation application and claims the priority benefit under 35 U.S.C. §120 of PCT Application No. PCT/JP2011/066401 filed on Jul. 20, 2011 which application designates the U.S., and also claims the priority benefit under 35 U.S.C. §119 of Japanese Patent Application No. 2010-209901 filed on Sep. 17, 2010, which applications are all hereby incorporated by reference in their entireties.

TECHNICAL FIELD

The present invention relates to an imaging device, and, more particularly, relates to an imaging device having an optical viewfinder (OVF) and electronic viewfinder (EVF).

BACKGROUND ART

In the related art, there is known a hybrid finder formed with an OVF and EVF (PTL 1). This hybrid finder overlaps an optical image of the OVF and an image of the EVF by a half mirror so as to visualize the both images at the same time.

Also, there is suggested a camera device configured to detect a defocus amount and display information indicating the detected defocus amount on an EVF (PTL 2). According to this camera device, it is possible to reliably bring it into focus by a manual operation based on the information which indicates the defocus amount and is displayed on the EVF.

Also, there is suggested a double-image synthesis range finder device that acquires an image corresponding to an optical image of one of two finder optical systems arranged with a predetermined base length in a camera body, from an imaging element, displays this image on a display unit, synthesizes it with an optical image of the other finder optical system and displays the result (PTL 3). This double-image synthesis range finder device can display a double image equivalent to that of the double-image synthesis range finder in the related art to move an image displayed on the display unit in conjunction with an extension operation of an imaging lens and thereby displace an optical image by a mobile mirror.

PTL 4 discloses an example of a CCD including a differential pixel.

CITATION LIST

Patent Literature

{PTL 1} Japanese Patent Application Laid-Open No. 4-30677
{PTL 2} Japanese Patent Application Laid-Open No. 6-113184
{PTL 3} Japanese Patent Application Laid-Open No. 2002-116479
{PTL 4} Japanese Patent Application Laid-Open No. 2004-191629

SUMMARY OF INVENTION

Technical Problem

The hybrid finder disclosed in PTL 1 cannot display a focusing state and therefore cannot be used at the time of manual focus.

The camera device disclosed in PTL 2 can perform manual focus based on the defocus amount displayed on the EVF but cannot visualize a clear optical image unlike the OVF. Also, the camera device disclosed in PTL 2 performs a manual operation based on the information indicating the defocus amount displayed together with an image of the EVF, and cannot visualize the focusing state on the image.

Meanwhile, the double-image synthesis range finder device disclosed in PTL 3 requires two finder optical systems in addition to the imaging lens and has to provide the imaging element to one of two finder optical systems, and therefore there is a problem that the device becomes large and the cost increases.

The present invention is made in view of the above conditions and it is an object to provide an imaging device that can clearly display a defocus using an OVF and EVF and be miniaturized at low cost.

Solution to Problem

To achieve the above object, the present invention provides an imaging device including: an imaging optical system; an imaging element that forms a subject image through the imaging optical system; a display unit that displays the subject image imaged by the imaging element, as a live view image; an optical viewfinder; a synthesis unit that synthesizes an optical image visually checked by the optical viewfinder and the live view image displayed by the display unit; a defocus amount calculation unit that calculates a defocus amount from a focusing state of the subject image; and a display control unit that displaces the live view image displayed on the display unit, with respect to the optical image, according to the defocus amount calculated by the defocus amount calculation unit, and that displays the subject image on the display unit so that the optical image fits the live view image when the defocus amount becomes zero.

According to this invention, at the time of synthesizing and displaying the optical image displayed by the optical viewfinder and the live view image imaged through the imaging optical system and the imaging element, the live view image is displaced and displayed based on the defocus amount from the focusing state of the subject image. By this means, it is possible to display the defocus (i.e. focusing information) clearly without employing a range finder configuration, thereby assisting the user to focus on a desired subject by a manual operation.

Preferably, this imaging device includes a subject distance detection unit that detects a subject distance, where: the optical viewfinder includes an optical system different from the imaging optical system; and the display control unit displaces the live view image displayed on the display unit, with respect to the optical image, based on the defocus amount calculated by the defocus amount calculation unit and the subject distance detected by the subject distance detection unit. The optical viewfinder is formed with the optical system different from the imaging optical system, and therefore the optical image and the live view image provide a parallax based on the subject distance. In this invention, by displacing the live view image with respect to the optical image based on the defocus amount and the subject distance, it is possible to correct the image defocus due to the parallax and displace the live view image based on the defocus amount.

Preferably, the optical viewfinder is a single-reflex finder. In the case of the single-reflex finder, essentially, since the optical image and the live view image are matched and the parallax is not caused, but, according to this invention, the live view image is displaced and displayed with respect to the defocus amount so as to clarify the defocus.

Preferably, this imaging device includes a high frequency component detection unit that detects high frequency components in multiple directions in a focus area of the subject image imaged by the imaging element, where the display control unit displaces the live view image displayed on the display unit in a direction in which a high frequency component number is the largest, in the multiple high frequency components detected by the high frequency component detection unit. Depending on an imaged picture, there is a case where, even if the live view image is displaced and displayed with respect to the optical image, the result cannot be visually checked as a double-image, but, according to this invention, by displacing and displaying the live view image in a direction to clarify the displacement, it is possible to display the defocus clearly.

Preferably, this imaging device includes a focus area selection unit that selects a focus area, where the display control unit displaces only a live view image in the focus area selected by the focus area selection unit. By this means, it becomes easier to look at the selected focus area.

Preferably, this imaging device includes: the imaging optical system including a variable focal lens; a detection unit that detects a change amount of a zoom factor of the variable focal lens; and a storage unit that stores a relationship between the change amount of the zoom factor of the variable focal lens and a defocus amount of the variable focal lens, where, in a case where the detection unit detects the change amount of the zoom factor of the variable focal lens, the display control unit reads a defocus amount associated with a change of the zoom factor from the storage unit, based on the change amount of the zoom factor, and displaces the live view image displayed on the display unit based on the read defocus amount.

In the case of the variable focal lens, when the zoom factor is changed, the focus of the subject image focused before the change of the zoom factor is lost. According to this invention, when the zoom factor of the variable focal lens is changed, the defocus amount associated with the change of the zoom factor of the variable focal lens is read from the storage unit that stores in advance the relationship between the change amount of the zoom factor and the defocus amount, and the live view image is displaced based on the defocus amount. By this means, it is possible to displace the live view image based on the defocus amount without detecting the defocus amount or the like, and therefore it is possible to displace the live view image in real time.

Preferably, when the defocus amount calculated by the defocus amount calculation unit is "0," the display control unit displays focusing information indicating focusing on the display unit. The defocus amount between the optical image and the live view image is small near the focusing position and therefore it is difficult to decide the focusing state, but it is possible to clarify a decision with respect to the focusing state by a display of the focusing information.

Preferably, the focusing information is one of a blinking display of the live view image displayed on the display unit, a negative conversion display, a display of a focusing frame or focusing icon, a highlighting of a contour part of the live view image in the focus area and a display of only the live view image in the focus area.

Preferably, this imaging device includes: a brightness detection unit that detects subject brightness; and a decision unit that decides whether the subject brightness detected by the brightness detection unit is equal to or less than predetermined brightness in which the subject is less likely to be checked by the optical viewfinder, where, in a case where the decision unit decides that the subject brightness is equal to or less than the predetermined brightness, regardless of the defocus amount calculated by the defocus amount calculation unit, the display control unit displays the live view image, which is displayed on the display unit, on a position matching the optical image. In a dark situation where the subject is less likely to be checked by the optical viewfinder, even if the optical image and the live view image are displayed, it is not possible to visually check the defocus amount between them. According to this invention, in a dark situation where the subject is less likely to be checked by the optical viewfinder, the live view image is displayed on a position matching the optical image, thereby preventing the structure intended by the user from being mismatched.

Preferably, this imaging device includes a focus mode selection unit that selects a manual focus mode or an autofocus mode, where the display control unit displays the live view image on the display unit only in a case where the focus mode selection unit selects the manual focus mode.

Advantageous Effects of Invention

According to the present invention, at the time of synthesizing a live view image of an EVF over an optical image of an OVF and displaying the result, since the live view image is displaced by a calculated defocus amount, it is possible to clearly display the defocus.

DESCRIPTION OF EMBODIMENTS

In the following, an embodiment of an imaging device according to the present invention is explained with reference to the accompanying drawings.

[Imaging Device]

Figure 1:
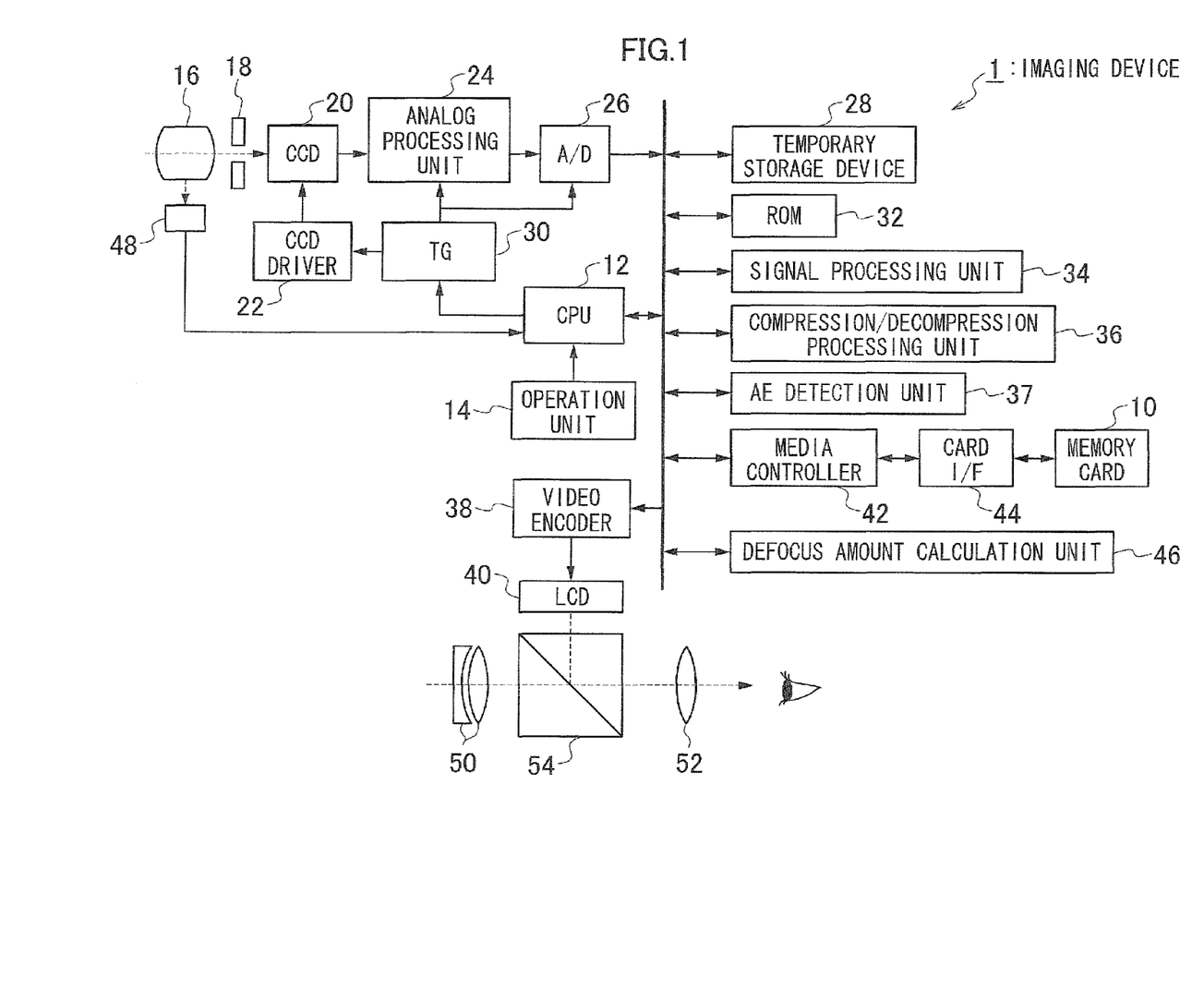
FIG. 1 is a block diagram illustrating an embodiment of an imaging device according to the present invention.

FIG. 1 is a block diagram illustrating an embodiment of an imaging device according to the present invention.

This imaging device 1 is a digital camera that records an imaged still image or moving image in a memory card 10, and the entire camera operation is integrally controlled by a central processing unit (CPU) 12.

An operation unit 14 of the imaging device 1 includes a mode switching switch, a multi-function arrow key, and the like, where the mode switching switch switches between a power switch, a shutter button, a still image imaging mode, a moving image imaging mode, a playback mode, an autofocus adjustment (AF mode), a manual focus adjustment (MF mode), and the like, and the multi-function arrow key outputs various instruction signals such as zoom and frame advance. The various operation signals from this operation unit 14 are added by a CPU 12.

When an imaging mode is set, image light indicating a subject is formed on a light receiving surface of an imaging element (CCD) 20, via an imaging optical system 16 including a focus lens that can be moved by a manual operation and a diaphragm 18. Signal charges accumulated in the CCD 20 are sequentially read as voltage signals corresponding to signal charges by transfer pulses added by a CCD driver 22. Also, the CCD 20 has a so-called electronic shutter function to control the charge accumulation time (i.e. shutter speed) of each photo sensor by the shutter gate pulse timing.

The voltage signals sequentially read from this CCD 20 are added to the analog processing unit 24. The analog processing unit 24 includes a signal processing circuit such as a sampling hold circuit, color separation circuit and gain adjustment circuit, performs correlation double sampling (CDS) processing and color separation processing on each of color signals of R, G and B, and adjusts the signal level of each color signal (i.e. pre-white balance processing). A signal output from the analog processing unit 24 is converted into a digital signal (hereinafter referred to as "CCDRAW data") by an A/D converter 26 and subsequently stored in a temporary storage device 28 such as an SDRAM.

The temporary storage device 28 has a storage capacity that can temporarily store multiple items of CCDRAW data. Here, the storage capacity of the temporary storage device 28 is not limited to this. Also, a timing generator (TG) 30 gives a timing signal to the CCD driver 22, the analog processing unit 24 and the A/D converter 26 according to an instruction of the CPU 12, and finds the synchronization of each circuit by this timing signal.

A ROM 32 stores a program, an adjustment value, or the like in advance, which are adequately read.

A signal processing unit 34 includes: a WB gain unit that adjusts the gains of R, G and B signals and performs white balance (WB) correction; a gamma correction unit that performs gamma correction according to a ROM table storing predetermined gamma characteristics with respect to each of the R, G and B signals subjected to WB correction; a color interpolation processing unit that performs color interpolation processing corresponding to a color filter array of the CCD 20; a YC processing unit that performs generation processing (YC conversion) of brightness data Y and color difference data Cr and Cb; a contour enhancement unit that performs contour enhancement by attaching an aperture signal to the brightness data Y; a noise reduction processing unit that performs noise reduction processing such as smoothing processing and median filter processing; an intensity enhancement unit that increases or decreases the gains of the color difference data Cr and Cb, and the like, where the signal processing of each processing unit is sequentially performed on the CCDRAW data stored in the temporary storage device 28.

Image data processed in the signal processing unit 34 is encoded in a video encoder 38 and output to a small liquid crystal display unit (LCD) 40, thereby displaying a subject image on a display screen of the LCD 40.

Also, at the imaging preparation stage, after images continuously imaged by the CCD 20 at predetermined intervals are subjected to image display processing, they are output to an LCD 40 and displayed as live view images (i.e. through images).

Meanwhile, an image is imaged through the imaging optical system 16 and the CCD 20 at the time a shutter button is fully pressed, and, after the CCDRAW data stored in the temporary storage device 28 is subjected to various kinds of signal processing in the signal processing unit 34 and converted into YC data, the YC data is output to the compression/decompression processing unit 36 and predetermined compression processing such as JPEG (Joint Photographic Experts Group) is performed. Subsequently, compression data subjected to compression processing is stored in the memory card 10 through a media controller 42 and a card interface 44.

For example, an automatic exposure (AE) detection unit 37 integrates G signals of the entire screen or integrates G signals subjected to different weighting between a screen center part and a peripheral part, and outputs the integration value to the CPU 12. The CPU 12 calculates the brightness (i.e. imaging Ev value) of the subject by the integration value input from the AE detection unit 37, determines the F value of the diaphragm 18 and the electronic shutter (i.e. shutter speed) of the CCD 20 based on this imaging Ev value according to a predetermined program line map, controls the diaphragm 18 based on the determined F value and controls the charge accumulation time in the CCD 20 through the CCD driver 22 based on the determined shutter speed.

Also, a defocus amount calculation unit 46 detects a phase difference between parallax images in a predetermined focus area among parallax images acquired from phase difference pixels of the CCD 20 including the phase difference pixels, and calculates a focus misalignment amount (a defocus amount) based on information indicating this phase difference. As the CCD 20 including phase difference pixels, it is possible to apply the disclosure in PTL 4, etc. Also, instead of the CCD 20 including phase difference pixels, it may be possible to detect the defocus amount based on an output signal of for example, a known phase difference sensor including a separator lens and a sensor to detect a position in which two images separated by the separator lens are formed.

This defocus amount calculated by the defocus amount calculation unit 46 can be used to control the focus lens of the imaging optical system 16 such that the defocus amount is "0" at the time of the AF mode, and it is used to perform display control of a through image on the LCD 40 at the time of an MF mode as described later.

Also, a focus lens position of the imaging optical system 16 is detected by a position sensor 48 and added to the CPU 12. Based on the detection output of the position sensor 48, the CPU 12 calculates the distance of the subject focused by the current focus lens position. Also, the focus lens position and the subject distance corresponding to the position are stored in advance in the ROM 32 or the like, and the CPU 12 reads the subject distance corresponding to the focus lens position from this ROM 32. Also, the subject distance may be measured by a base length triangulation sensor or the like. The subject distance measured as above can be used to control the focus lens of the imaging optical system 16 at the time of the AF mode, and it is used for display control of the through image on the LCD 40 at the time of the MF mode as described later. The position sensor 48 detects also a variable-power lens position (i.e. zoom position) of the imaging optical system 16 and outputs information of the zoom position to the CPU 12.

Further, this imaging device 1 includes an optical viewfinder (OVF) having an objective lens 50 and an eyepiece lens 52.

A beam splitter 54 is provided between the objective lens 50 and the eyepiece lens 52, and used as a section to synthesize a subject optical image entered in the objective lens 50 and the through image displayed on the LCD 40. That is, the optical image entered in the objective lens 50 can be observed by the eyepiece lens 52 through the beam splitter 54, and the through image displayed on the LCD 40 can be orthogonally reflected by the beam splitter 54 and observed by the eyepiece lens 52.

The LCD 40, the beam splitter 54 and the eyepiece lens 52 form an electronic viewfinder (EVF) that can observe a through image.

That is, the imaging device 1 includes a hybrid finder that synthesizes an optical image of the OVF and a through image of the EVF and displays the result.

Since the light axis of the imaging optical system 16 and the light axis of the OVF are different, an optical image and through image in a predetermined focus area provide a parallax based on the distance of the subject in the focus area. The CPU 12 moves a display position of the through image displayed on the LCD 40 so as to correct the parallax caused according to the found subject distance. By this means, it is possible to perform a display such that the optical image and the through image in the focus area are matched.

First Embodiment

Figure 2:
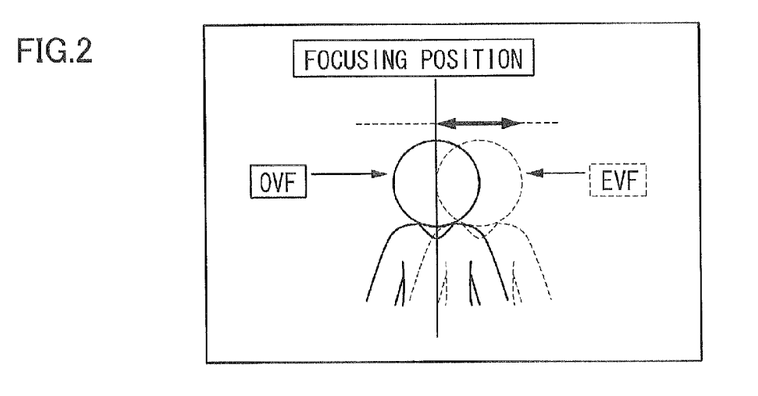
FIG. 2 is a diagram illustrating an example of a finder image displayed on a hybrid finder according to the present invention.

FIG. 2 is a diagram illustrating an example of a finder image displayed on the hybrid finder having the above configuration, where an optical image of an OVF is indicated by a solid line and a through image of an EVF is indicated by a dotted line.

The CPU 12 displaces a display position of the through image displayed on the LCD 40 with respect to the optical image, according to the defocus amount calculated by the defocus amount calculation unit 46 at the time of the MF mode. By this means, in a case where the defocus is caused, the user can visually contact with a double image in which the optical image and the through image are misaligned, and perform a manual operation of the focus lens of the imaging optical system 16 such that this double image is corrected.

Meanwhile, since the parallax of the optical image and the through image is corrected based on the subject distance as described above, when the defocus amount becomes "0," the optical image and the through image are matched.

Also, the focus misalignment amount (the defocus amount) calculated by the defocus amount calculation unit 46 and the displacement amount of the through image displayed on the EVF are made variable by the F value of the diaphragm 18 or the focus distance or imaging distance of the imaging optical system 16.

Also, regarding the defocus amount in the front point and the rear point, the displacement direction of the EVF through image with respect to the OVF optical image is caused to be opposite. In the case of FIG. 2, the front point is displaced to the left direction and the rear point is displaced to the right direction.

Second Embodiment

Figure 3:
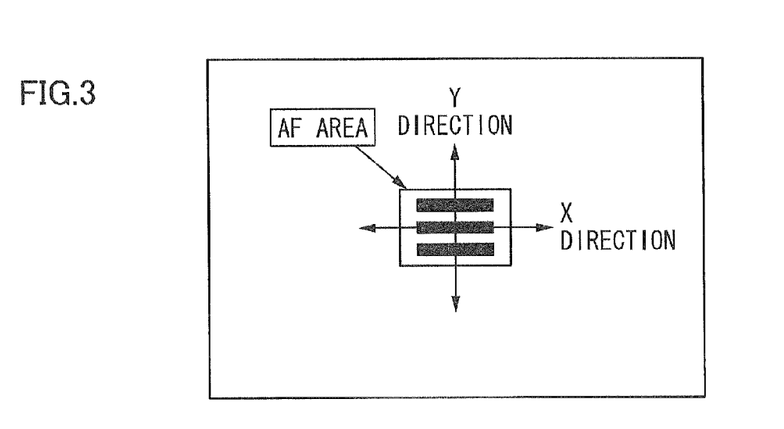
FIG. 3 is a diagram illustrating a case where there is a banding pattern subject in a focus area.

FIG. 3 illustrates a case where there is a banding pattern subject in a focus area. In the case of such a subject, even if the EVF through image is displaced in the horizontal direction, it cannot be recognized as a double image.

In the second embodiment, to solve such a problem, a direction is detected in which the number of high frequency components of the subject in a focus area is larger, and the EVF through image is displaced in the direction in which the number of high frequency components is larger.

Figure 4A:
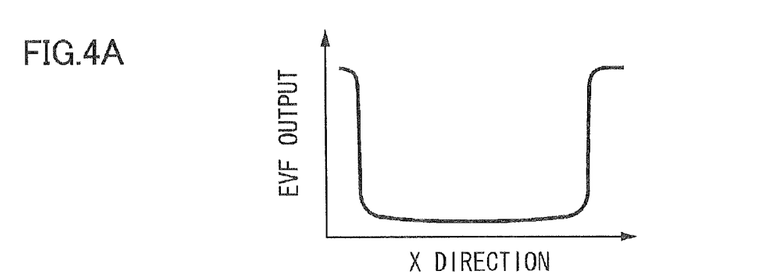
FIG. 4A is a diagram illustrating an output (brightness) of a through image of an EVF on the X axis of the subject illustrated in FIG. 3.
Figure 4B:
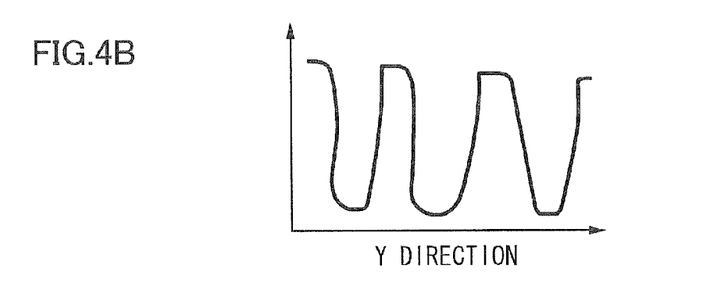
FIG. 4B is a diagram illustrating an output (brightness) of a through image of an EVF on the Y axis of the subject illustrated in FIG. 3.

In the case of the subject illustrated in FIG. 3, outputs (i.e. brightness) of the EVF through image on the X axis and the Y axis are as illustrated in FIGS. 4A and 4B. As clear from FIGS. 4A and 4B, in the case of this subject, since the number of high frequency components is larger in the Y direction than the X direction, the EVF through image is displaced in the Y direction with respect to the OVF optical image.

That is, the CPU 12 calculates an integration value of the absolute value of a difference between pixel values adjacent in the X direction of the through image in the focus area, calculates an integration value of the absolute value of a difference between pixel values adjacent in the Y direction, and decides that there are a larger number of high frequency components in the direction with a larger integration value. Subsequently, at the time of displacing the through image displayed on the LCD 40 according to the defocus amount, it is displaced in the direction in which there are a larger number of high frequency components.

Third Embodiment

Figure 5A:
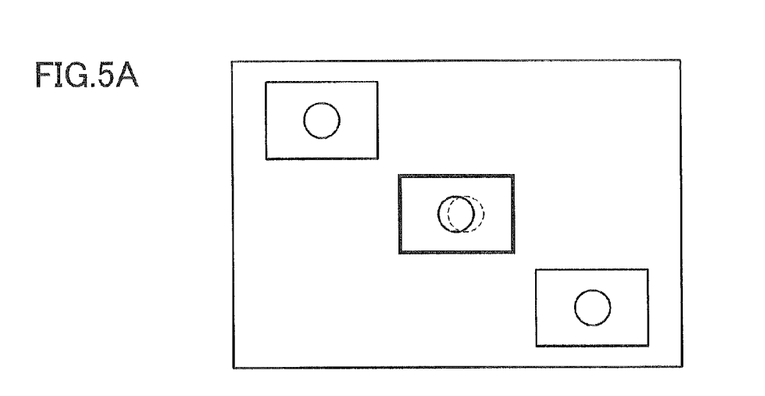
FIG. 5A is a diagram illustrating another display example of a finder image displayed on a hybrid finder.
Figure 5B:
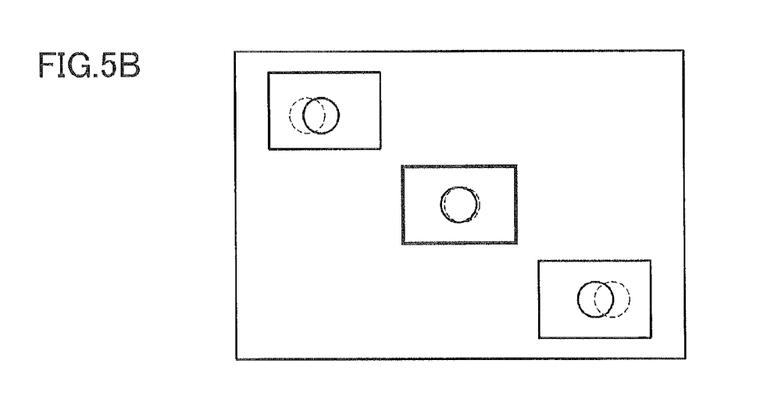
FIG. 5B is a diagram illustrating another display example of a finder image displayed on a hybrid finder.

FIG. 5 illustrates another display example of a finder image displayed on a hybrid finder.

In the third embodiment, the user can arbitrarily select a focus area. In the example illustrated in FIG. 5, a thick frame indicates a focus area that is currently selected. That is, the CPU 12 displays the focus area (i.e. thick frame) on the LCD 40, and, when a selection (movement) of the focus area by the arrow key of the operation unit 14 or the like is instructed by the user, moves the focus area according to the instruction.

FIG. 5A illustrates an example where, when a focus area is selected, only a through image in the selected focus area is displaced according to the defocus amount. FIG. 5B illustrates an example where a through image different from that in the selected focus area is also displaced according to the defocus amount.

In the case of FIG. 5A, there are a method of displaying the through image only in the selected focus area and a method of displacing the through image only in the selected focus area according to the defocus amount and not displacing through images in other areas.

Also, in the case of FIG. 5B, depending on the focus area position, the defocus amount of the through image varies.

Also, it is not limited that the focus area selection is performed by the user, and, for example, in the case of an imaging device having a face detection function, a face area detected by the face detection function may be selected as a focus area.

Fourth Embodiment

In the case of using a variable focal lens as the imaging optical system 16, when the variable focal lens is zoomed, the focus of the subject focused before the zoom is lost.

Figure 6A:
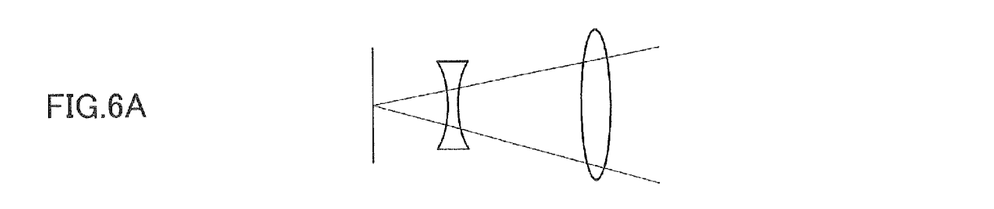
FIG. 6A is a diagram illustrating an optical system of a variable focal lens before being subjected to variable power.
Figure 6B:
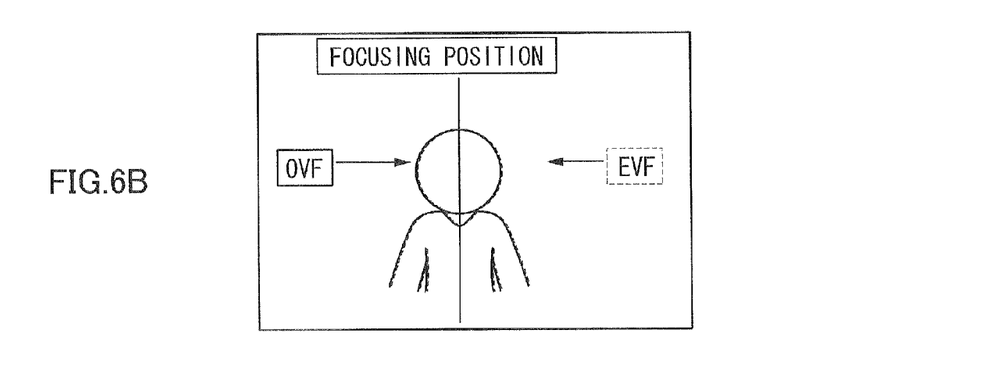
FIG. 6B is a diagram illustrating a finder image of a hybrid finder before being subjected to variable power.

FIG. 6A illustrates an optical system of a variable focal lens in a case where the subject is focused before zoom. FIG. 6B illustrates a finder image of a hybrid finder at the time.

Figure 7A:
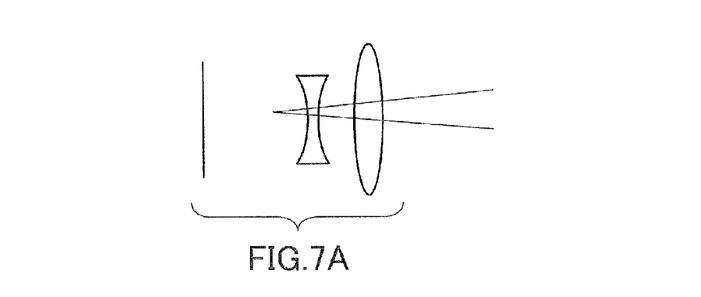
FIG. 7A is a diagram illustrating an optical system of a variable focal lens after being subjected to variable power.

FIG. 7A illustrates the optical system in which the variable focal lens illustrated in FIG. 6A is zoomed, and, as illustrated in this figure, the focus position is moved to the front point.

In the fourth embodiment, since the zoom amount of the variable focal lens and the attendant defocus amount depend on the lens optical performance, the zoom change amount and the attendant defocus amount are calculated in advance and their relationship is stored in a storage section such as the ROM 32.

Figure 7B:
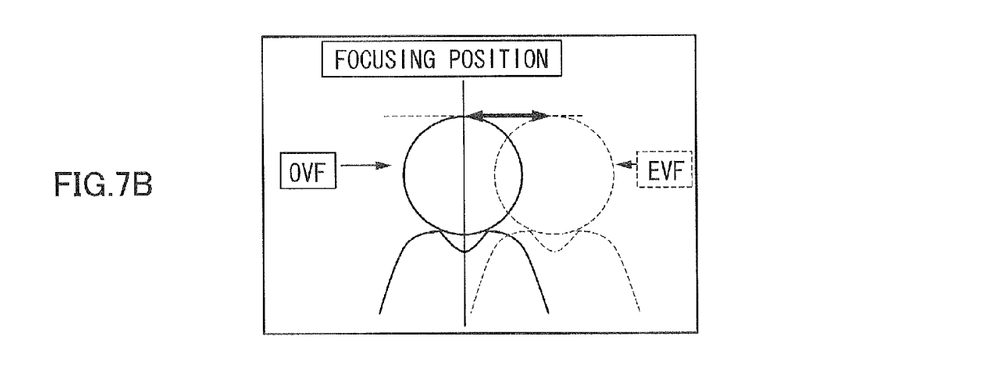
FIG. 7B is a diagram illustrating a finder image of a hybrid finder after being subjected to variable power.

The CPU 12 calculates the change amount of the zoom factor by a variable-power lens position (i.e. zoom position) output from the position sensor 48, reads the defocus amount caused by the zoom factor change from the ROM 32 based on the zoom factor and displaces the through image displayed on the LCD 40 based on the read defocus amount. FIG. 7B illustrates a finder image of the hybrid finder in a case where the EVF through image is displaced with respect to the OVF optical image as described above.

According to this, it is possible to displace the EVF through image depending on the defocus amount without detecting the defocus amount or the like, and therefore it is possible to displace the through image in real time.

Fifth Embodiment

An optical image and live view image displayed on a hybrid finder have a small defocus amount near a focusing position, and there is a problem that it is difficult to make a decision with respect to a focusing state.

In the fifth embodiment, a twist is given to a display method of a hybrid finder so as to make it easy to decide a focusing state.

The CPU 12 can detect a focusing state (corresponding to the timing the defocus amount is "0") by the defocus amount calculated by the defocus amount calculation unit 46 during focus adjustment of the imaging optical system 16 by a manual operation. When detecting the focusing state, the CPU 12 displays focusing information on the hybrid finder (i.e. the LCD 40 of the EVF).

Figure 8A:
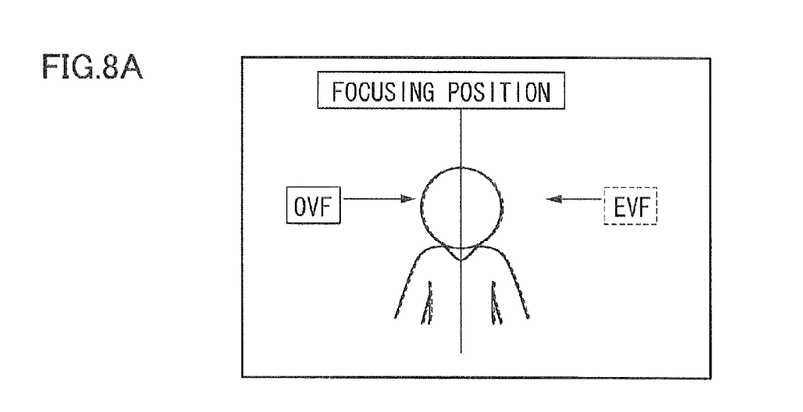
FIG. 8A is a diagram illustrating a case where an optical image of an OVF and a through image of an EVF are displayed on a hybrid finder, the defocus amount is 0 and both images are matched.

FIG. 8A illustrates an OVF optical image and EVF through image displayed on a hybrid finder and relates to a case where the defocus amount is "0" and both images are matched.

Figure 8B:
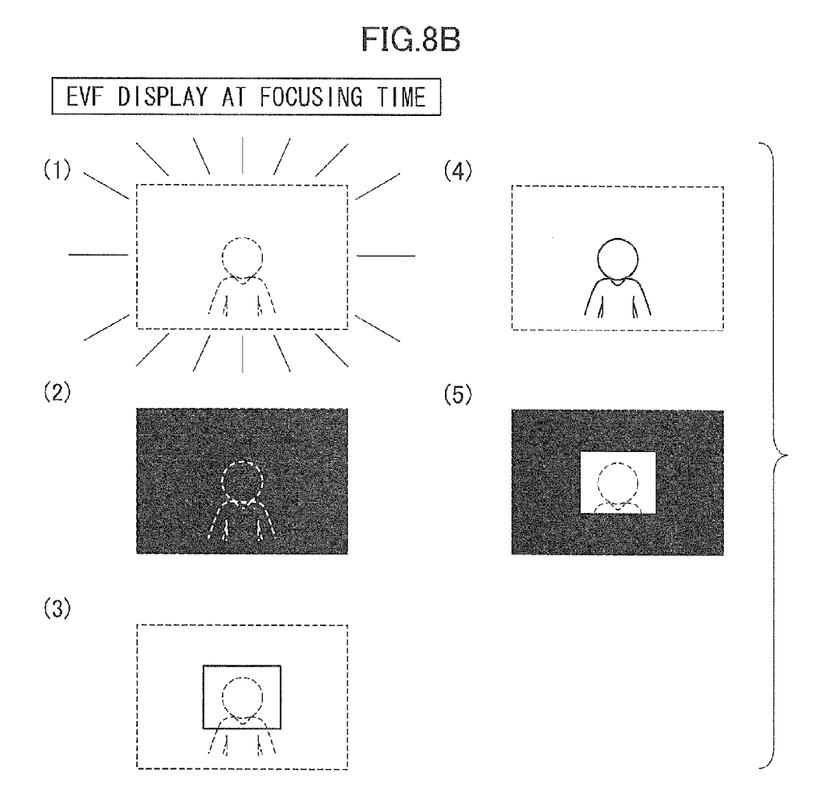
FIG. 8B is a diagram illustrating focusing information displayed on an LCD of an EVF when the defocus amount is 0.

When detecting that the defocus amount is "0," the CPU 12 changes the through image displayed on the LCD 40 of the EVF as illustrated in examples (1) to (5) in FIG. 8B, and reports a focusing state to the user.

Example (1): a through image displayed on the LCD 40 of the EVF is blinked.

Example (2): the through image displayed on the LCD 40 of the EVE is subjected to negative inversion.

Example (3): a focusing frame is displayed on the through image displayed on the LCD 40 of the EVF. Here, instead of the focusing frame, a focusing icon indicating the focusing may be displayed.

Example (4): only a contour part of the subject in the through image displayed on the LCD 40 of the EVF is emphasized and displayed.

Example (5): only a focus area in the through image displayed on the LCD 40 of the EVF is displayed.

Here, the display content displayed on the LCD 40 of the EVF at the time of focusing is not limited to above examples (1) to (5), and various display formats are possible.

Sixth Embodiment

Figure 9A:
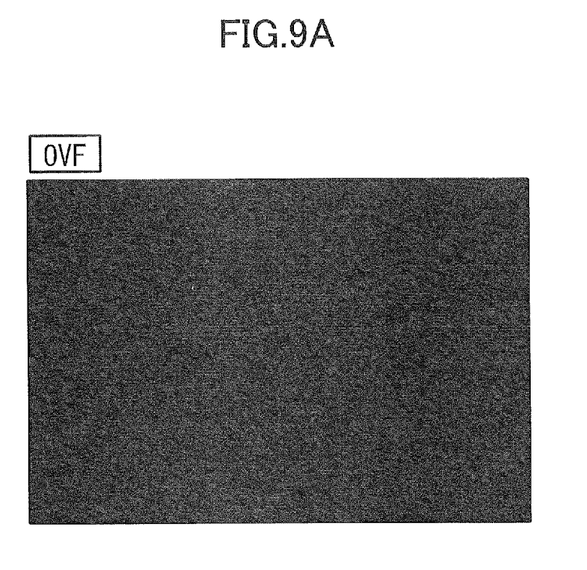
FIG. 9A is a diagram illustrating an optical image of an OVF when a subject is dark.
Figure 9B:
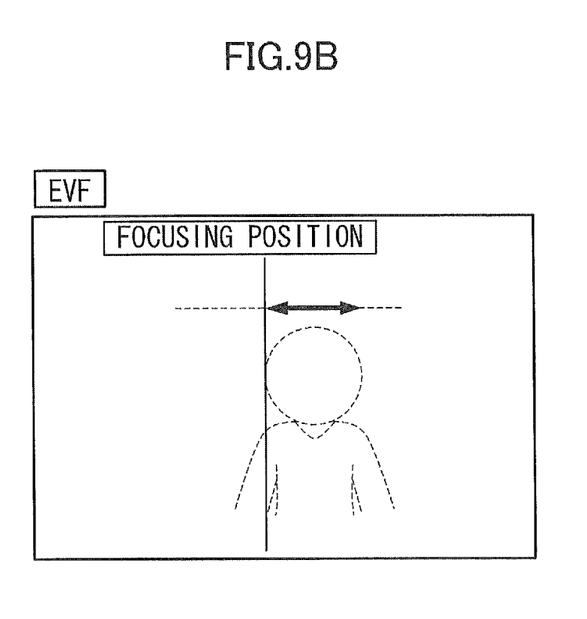
FIG. 9B is a diagram illustrating a through image of an EVF when a subject is dark.

As illustrated in FIG. 9A, there is a problem that an optical image of an OVF is difficult to be checked in a dark situation such as the nighttime and a dark room inside. Meanwhile, as illustrated in FIG. 9B, a through image of an EVF can be subjected to brightness adjustment (i.e. sensitivity adjustment) and therefore checked even in a dark situation.

In such a state, when the EVF through image is displaced with respect to the OVF optical image according to the defocus amount and displayed (FIG. 9B), since the user can check only the EVF through image, there is a possibility that the imaged image and a structure intended by the user are mismatched.

In the sixth embodiment, when the CPU 12 decides that the subject brightness measured in the AR detection unit 37 or the like is equal to or less than a predetermined value set in advance (i.e. predetermined brightness in which the subject is difficult to be checked by the OVF), the CPU 12 displays the through image displayed on the LCD 40 of the EVF without displacing the through image (i.e. the CPU 12 displays it on a position matching the OVF optical image) regardless of the defocus amount calculated by the defocus amount calculation unit 46.

By this means, the structure intended by the user is prevented from being mismatched.

Seventh Embodiment

Figure 10:
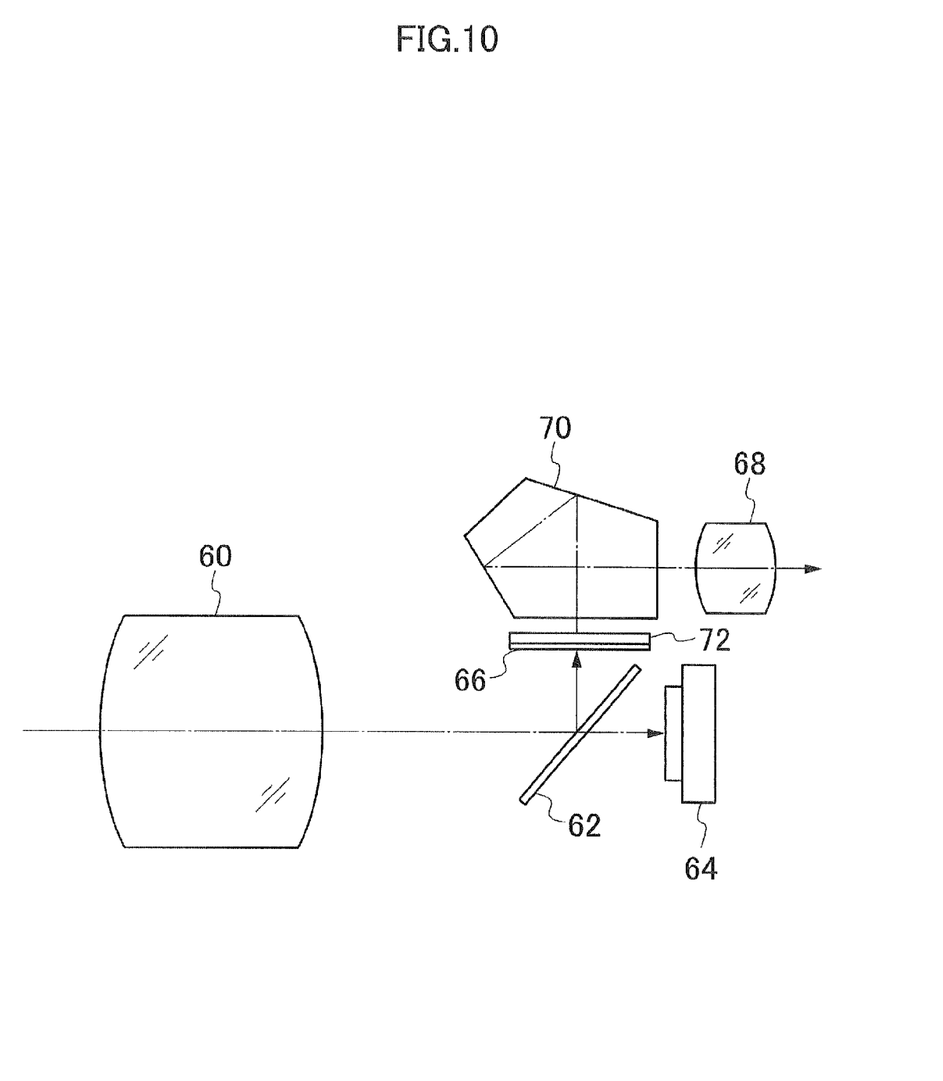
FIG. 10 is a diagram illustrating another embodiment of an imaging optical system and finder optical system applied to an imaging device according to the present invention.

FIG. 10 is a diagram illustrating another embodiment of an imaging optical system and finder optical system applied to an imaging device according to the present invention.

Although the imaging device 1 illustrated in FIG. 1 is applied in which the light axis of an OVF is different from the light axis of the imaging optical system 16, the OVF according to the seventh embodiment illustrated in FIG. 10 is a single-reflex finder having the same light axis as that of an imaging optical system 60.

That is, a subject light entered in the imaging optical system 60 enters a CCD 62 through a translucent quick return mirror 62, and part of it is reflected in the quick return mirror 62 and enters a focus board 66. An optical image led onto this focus board 66 can be checked through an eyepiece lens 68 and a pentaprism 70.

Meanwhile, a transmissive LCD 72 is arranged on the focus board 66 and a through image imaged by the CCD 64 is displayed. Similar to the above optical image, this through image can be checked through the eyepiece lens 68 and the pentaprism 70, thereby forming a hybrid finder.

A parallax does not occur in an OVF of a single-reflex type and an optical image of the OVF and a through image on the LCD 72 are matched, but the present invention displaces and displays the through image on the LCD 72 with respect to the optical image according to the defocus amount, thereby further clarifying the defocus.

That is, in the OVF of the single-reflex type, since its optical image blurs when defocus occurs, it is possible to check the defocus. However, in the present invention, by further displacing a through image with respect to the optical image and providing a double-image, it is possible to find the defocus more clearly. Also, it is not possible to decide the front point or the rear point only by the OVF of the single-reflex type, but, in the present invention, it is possible to decide the front point or the rear point by the displacement direction of the through image with respect to the optical image.

[Others]

As the OVF illustrated in FIG. 1, it is not limited to a zoom finder that performs zooming in tandem with the zooming of the imaging optical system 16 but may be a single-focus finder. In this case, when the zooming is performed in the imaging optical system 16, since a field angle of the optical image and a field angle of the through image are not matched, these field angels are matched by scaling the through image displayed on the LCD 40.

Also, it is needless to say that the above embodiments are adequately combined and applied.

Further, an LCD different from the LCD 40 of the EVF may be set on the back surface of the imaging device 1, and it is possible to check a field angle at the time of an AF mode or display a playback image at the time of a playback mode by this back-surface LCD. Further, a mechanism that can take a douser in or out on a light path of the OVF may be set, and the OVF optical image and the EVF through image may be switched and led to the eyepiece lens 52. By this means, it is possible to display the through image on the EVF only when an MF mode is selected, and assist focusing by a manual operation.

Also, it is needless to say that the present invention is not limited to the above embodiments and various changes may be made without departing from the gist of the present invention.

REFERENCE SIGNS LIST

1 Imaging device
10 Memory card
12 Central processing unit (CPU)
14 Operation unit
16, 60 Imaging optical system
18 Diaphragm
20, 64 Imaging element (CCD)
32 ROM
34 Signal processing unit
37 AE detection unit
40, 72 Liquid crystal device (LCD)
46 Defocus amount calculation unit
50 Objective lens
52, 68 Eyepiece lens
54 Beam splitter
62 Quick return mirror
66 Focus board
70 pentaprism

The invention claimed is:

1. An imaging device comprising:
   an imaging optical system;
   an imaging element that forms a subject image through the imaging optical system;
   a display unit that displays the subject image imaged by the imaging element, as a live view image;
   an optical viewfinder;
   a synthesis unit that synthesizes an optical image visually checked by the optical viewfinder and the live view image displayed by the display unit;
   a defocus amount calculation unit that calculates a defocus amount from a focusing state of the subject image; and
   a display control unit that displaces the live view image displayed on the display unit, with respect to the optical image, according to the defocus amount calculated by the defocus amount calculation unit, and that displays the subject image on the display unit so that the optical image fits the live view image when the defocus amount becomes zero.

2. The imaging device according to claim 1, further comprising a subject distance detection unit that detects a subject distance, wherein:
   the optical viewfinder includes an optical system different from the imaging optical system; and
   the display control unit displaces the live view image displayed on the display unit, with respect to the optical image, based on the defocus amount calculated by the defocus amount calculation unit and the subject distance detected by the subject distance detection unit.

3. The imaging device according to claim 1, wherein the optical viewfinder comprises a single-reflex finder.

4. The imaging device according to claim 1, further comprising a high frequency component detection unit that detects high frequency components in multiple directions in a focus area of the subject image imaged by the imaging element,
   wherein the display control unit displaces the live view image displayed on the display unit in a direction in which a high frequency component number is the largest, among a plurality of high frequency components detected by the high frequency component detection unit.

5. The imaging device according to claim 1, further comprising a focus area selection unit that selects a focus area,
   wherein the display control unit displaces only a live view image in the focus area selected by the focus area selection unit.

6. The imaging device according to claim 1, further comprising:
   the imaging optical system including a variable focal lens;
   a detection unit that detects a change amount of a zoom factor of the variable focal lens; and
   a storage unit that stores a relationship between the change amount of the zoom factor of the variable focal lens and a defocus amount of the variable focal lens,
   wherein, in a case where the detection unit detects the change amount of the zoom factor of the variable focal lens, the display control unit reads a defocus amount associated with a change of the zoom factor from the storage unit, based on the change amount of the zoom factor, and displaces the live view image displayed on the display unit based on the read defocus amount.

7. The imaging device according to claim 1, wherein, when the defocus amount calculated by the defocus amount calculation unit is 0, the display control unit displays focusing information indicating focusing on the display unit.

8. The imaging device according to claim 7, wherein the focusing information is one of a blinking display of the live view image displayed on the display unit, a negative conversion display, a display of a focusing frame or focusing icon, a highlighting of a contour part of the live view image in the focus area and a display of only the live view image in the focus area.

9. The imaging device according to claim 1, further comprising:
   a brightness detection unit that detects subject brightness; and a decision unit that decides whether the subject brightness detected by the brightness detection unit is equal to or less than predetermined brightness in which the subject is less likely to be checked by the optical viewfinder, wherein, in a case where the decision unit decides that the subject brightness is equal to or less than the predetermined brightness, regardless of the defocus amount calculated by the defocus amount calculation unit, the display control unit displays the live view image which is displayed on the display unit, on a position matching the optical image.

10. The imaging device according to claim 1, further comprising a focus mode wherein the display control unit displays the live view image on the display unit only in a case where the focus mode selection unit selects the manual focus mode.

11. The imaging device according to claim 1, wherein, at a time of synthesizing and displaying the optical image displayed by the optical viewfinder and the live view image imaged through the imaging optical system and the imaging element, the live image is displaced and displayed based on the defocus amount from the focusing state of the subject image.

12. The imaging device according to claim 1, wherein the optical viewfinder includes an optical system different from the imaging optical system such that the optical image and the live view image provide a parallax based on a subject distance.

13. The imaging device according to claim 1, wherein the defocus amount calculation unit calculates the defocus amount based on an output signal of a known phase difference sensor including a separator lens and a sensor to detect a position in which two images separated by the separator lens are formed.

14. The imaging device according to claim 1, wherein the synthesis unit further includes an optical member provided on a light path of the optical viewfinder.

15. The imaging device according to claim 1, wherein a light axis of the imaging optical system and a light axis of the optical viewfinder are different.

16. The imaging device according to claim 1, further comprising a subject distance detection unit that detects a subject distance, wherein a light axis of the imaging optical system and a light axis of the optical viewfinder are different such that the optical image and the live view image in a focus area of the subject image provide a parallax based on the subject distance of a subject in the focus area.

17. The imaging device according to claim 14, wherein the display position of the live view image is moved so as to correct a parallax caused according to a subject distance.

18. The imaging device according to claim 2, wherein a light axis of the imaging optical system and a light axis of the optical viewfinder are different such that the optical image and the live view image in a focus area of the subject image provide a parallax based on the subject distance of a subject in the focus area.

19. An imaging device comprising:
an imaging optical system;
an imaging element that forms a subject image through the imaging optical system;
a display unit that displays the subject image imaged by the imaging element, as a live view image;
an optical viewfinder;
a synthesis unit that synthesizes an optical image visually checked by the optical viewfinder and the live view image displayed by the display unit;
a defocus amount calculation unit that calculates a defocus amount from a focusing state of the subject image;
a display control unit that displaces the live view image displayed on the display unit, with respect to the optical image, according to the defocus amount calculated by the defocus amount calculation unit, and that displays the subject image on the display unit so that the optical image fits the live view image when the defocus amount becomes zero; and
a high frequency component detection unit that detects high frequency components in multiple directions in a focus area of the subject image imaged by the imaging element,
wherein the display control unit displaces the live view image displayed on the display unit in a direction in which a high frequency component number is the largest, among a plurality of high frequency components detected by the high frequency component detection unit.

20. An imaging device comprising:
an imaging optical system;
an imaging element that forms a subject image through the imaging optical system;
a display unit that displays the subject image imaged by the imaging element, as a live view image;
an optical viewfinder;
a synthesis unit that synthesizes an optical image visually checked by the optical viewfinder and the live view image displayed by the display unit;
a defocus amount calculation unit that calculates a defocus amount from a focusing state of the subject image;
a display control unit that displaces the live view image displayed on the display unit, with respect to the optical image, according to the defocus amount calculated by the defocus amount calculation unit, and that displays the subject image on the display unit so that the optical image fits the live view image when the defocus amount becomes zero;
the imaging optical system including a variable focal lens;
a detection unit that detects a change amount of a zoom factor of the variable focal lens; and
a storage unit that stores a relationship between the change amount of the zoom factor of the variable focal lens and a defocus amount of the variable focal lens,
wherein, in a case where the detection unit detects the change amount of the zoom factor of the variable focal lens, the display control unit reads a defocus amount associated with a change of the zoom factor from the storage unit, based on the change amount of the zoom factor, and displaces the live view image displayed on the display unit based on the read defocus amount.

* * * * *